United States Patent
Haruyama

(10) Patent No.: US 7,843,541 B2
(45) Date of Patent: Nov. 30, 2010

(54) TRANSFLECTIVE LIQUID CRYSTAL DEVICE AND ELECTRONIC EQUIPMENT HAVING FIRST AND SECOND ELECTRODES EACH WITH FIRST AND SECOND BRANCH ELECTRODES

(75) Inventor: Akihide Haruyama, Suwa (JP)

(73) Assignee: Sony Corporation, Tokyo (JP)

( * ) Notice: Subject to any disclaimer, the term of this patent is extended or adjusted under 35 U.S.C. 154(b) by 296 days.

(21) Appl. No.: 11/851,850

(22) Filed: Sep. 7, 2007

(65) Prior Publication Data

US 2008/0100764 A1 May 1, 2008

(30) Foreign Application Priority Data

Oct. 31, 2006 (JP) .............................. 2006-295362

(51) Int. Cl.
*G02F 1/1335* (2006.01)
*G02F 1/1343* (2006.01)
(52) U.S. Cl. ..................... 349/141; 349/114; 349/143
(58) Field of Classification Search ................ 349/114, 349/141
See application file for complete search history.

(56) References Cited

U.S. PATENT DOCUMENTS

| | | | |
|---|---|---|---|
| 6,914,656 B2 * | 7/2005 | Sakamoto et al. ........... | 349/141 |
| 7,420,635 B2 | 9/2008 | Ozawa | |
| 2005/0151912 A1 * | 7/2005 | Miyachi et al. ............. | 349/141 |
| 2005/0264746 A1 * | 12/2005 | Ou ............................... | 349/149 |
| 2006/0170846 A1 * | 8/2006 | Ozawa ........................ | 349/114 |
| 2008/0259254 A1 | 10/2008 | Kikuchi et al. | |

FOREIGN PATENT DOCUMENTS

| | | |
|---|---|---|
| JP | A-11-014978 | 1/1999 |
| JP | A 2005-336477 | 12/2005 |
| JP | A-2006-215287 | 8/2006 |
| WO | WO 2005006068 A1 * | 1/2005 |
| WO | WO 2005/090520 A1 | 9/2005 |

OTHER PUBLICATIONS

English translation of Nakayoshi (KR10-2006-7000805).*

* cited by examiner

*Primary Examiner*—Andrew Schechter
*Assistant Examiner*—Paul C Lee
(74) *Attorney, Agent, or Firm*—K&L Gates LLP

(57) ABSTRACT

A liquid crystal device including a liquid crystal layer having liquid crystal which demonstrates an optically isotropic property when no electric field is applied and demonstrates an optically anisotropic property which is proportional to the square of the electric field strength when electric field is applied, and a pair of substrates which sandwich the liquid crystal layer, including sub-pixel areas each including a reflective display area for reflective display and a transmissive display area for transmissive display; and first and second electrodes provided in both of the reflective display area and the transmissive display area, wherein the liquid crystal layer is driven by an electric field generated between the first electrode and the second electrode, and wherein the distance between the first electrode and the second electrode in the transmissive display area is smaller than the distance between the first electrode and the second electrode in the reflective display area.

9 Claims, 7 Drawing Sheets

TRANSFLECTIVE LIQUID CRYSTAL DEVICE AND ELECTRONIC EQUIPMENT HAVING FIRST AND SECOND ELECTRODES EACH WITH FIRST AND SECOND BRANCH ELECTRODES

BACKGROUND

1. Technical Field

The present invention relates to a liquid crystal device and electronic equipment.

2. Related Art

In recent years, a display system with electronic polarization using an electro-optic effect is proposed. The electro-optic effect is a phenomenon in which the refractive index of a substance is changed by an external electric field. For example, Kerr effect is known as the electro-optic effect. The Kerr effect indicates a phenomenon in which when an electric field is applied to an isotropic polar substance, the birefringence which is proportional to the square of the electric field strength with the direction of the electric field as an optical axis is excited. As a liquid crystal material which develops such Kerr effect, a blue phase is known. The blue phase, being an optically isotropic liquid crystal phase which appears in a specific temperature range between a chiral nematic phase and an isotropic phase, is referred to as the blue phase since it often appears visually in blue, and is known in that the response speed is significantly high. Since the development temperature range of the blue phase is very narrow, attempt is made to enlarge the development temperature range by introducing high-polymer materials therein (See JP-A-2005-336477, for example).

In recent years, the liquid crystal device is widely used as a display unit of mobile electronic equipment such as mobile phones or mobile information terminal. In general, a transflective type, which provides reflective display and transmissive display, is employed for the liquid crystal device used in the mobile electronic equipment, and improvement of the visual field angle is achieved by further employing the lateral electric field system. Therefore, the high-speed response is achieved by using the blue phase in the transflective liquid crystal device of such lateral electric field system.

In general, in the transflective liquid crystal device, in order to obtain a preferably display both in the reflective display and the transmissive display, a structure for differentiating the cell thickness (thickness of the liquid crystal layer) between the reflective display area and the transmissive display area in the dot area (so-called multi-gap structure) is generally employed. However, since the blue phase cannot change the alignment of liquid crystal only in a local area in which the electric field is generated, when the cell thickness exceeds a predetermined value, the electric field does not reach the entire liquid crystal molecule, and hence the corresponding area does not contribute to brightness. Therefore, it is no longer necessary to form the multi-gap in the transflective area. However, when white display (for example, the phase difference of $\lambda/4$) is achieved in the reflective area, the phase difference in the transmissive area is $\lambda/4$, and hence the brightness is not sufficient. Therefore, the phase differences of the refractive index (retardation) do not match between the transmissive display area and the reflective display area, and hence the contrast of display is disadvantageously lowered.

SUMMARY

An advantage of some aspects of the invention is to provide a liquid crystal device and electronic equipment in which a desired coefficient of transmission is obtained in a transmissive area and reflective area when effecting transflective display using the above-described liquid crystal material.

A liquid crystal device according to an aspect of the invention including a liquid crystal layer having liquid crystal which is optically isotropic when no electric field is applied and shows optical anisotropy which is proportional to the square of an electric field which is applied to the liquid crystal, and a pair of substrates which sandwich the liquid crystal layer; including, sub-pixels each having a reflective display area for reflective display and a transmissive display area for transmissive display, and first and second electrodes provided in both of the reflective display area and the transmissive display area in the sub-pixel areas, wherein the liquid crystal layer is driven by an electric field generated between the first electrode and the second electrode, and the distance between the first electrode and the second electrode in the transmissive display area is smaller than the distance between the first electrode and the second electrode in the reflective display area.

In this configuration, since the distance between the first electrode and the second electrode in the transmissive display area is smaller than that in the reflective display area, the strength of the electric field generated between the electrodes is increased, so that the electric field generated in the transmissive display area is stronger than that generated in the reflective display area. Since light passes through the liquid crystal layer twice in the reflective display area, the virtual thickness of the liquid crystal becomes two times the transmissive display area. However, since the liquid crystal layer assumes the optically anisotropic property which is proportional to the square of the electric field strength, the optically anisotropic property of the transmissive display area is increased. Therefore, the phase differences of the refractive index (retardations) in the respective areas (transmissive display area and reflective display area) defined by the product of the thickness of the liquid crystal and the optically anisotropic property may be adjusted to be the same level. Therefore, the same level of coefficient of transmission (retardation) may be obtained in the respective areas, and high-intensity and high-contrast display may be obtained in the entire area of the sub-pixel areas.

Preferably, the distance between the first electrode and the second electrode in the reflective display area is set to approximately 1.4 times the distance between the first electrode and the second electrode in the transmissive display area.

The electric field E generated between the branch-shaped electrodes is defined by $E=V/d$, where V represents a voltage to be applied between the electrodes, and d represents the inter-electrode distance. Therefore, in this configuration, the optically anisotropic property in the transmissive display area may be the square of substantially 1.4 ($\sqrt{2}$) times, that is, two times the optically anisotropic property in the reflective display area, so that the retardations in the transmissive display area and the reflective display area may substantially be equalized without employing a multi-gap structure.

Preferably, at least one of the first electrode and second electrode has the electrode width in the transmissive display area smaller than the electrode width in the reflective display area.

In the lateral electric field system, since the electric field is not generated right above the electrode, the portions right above the electrodes do not contribute to display. Therefore, in this configuration, lowering of the numerical aperture in the transmissive display area is restrained by reducing the electrode widths of the first electrode and the second electrode arranged in the transmissive display area.

Preferably, the first electrode includes a plurality of first branch-shaped electrodes in the transmissive display area and the second electrode includes a plurality of second branch-shaped electrodes in the transmissive display area.

In this configuration, since the first branch-shaped electrodes and the second branch-shaped electrodes are formed in the transmissive display area, the electric field generated between the first electrode and the second electrode may be increased to a level higher than the reflective display area.

Preferably, at least one of the first electrode and the second electrode is branched into a plurality of pieces on one side, and the branched portion of the electrode is arranged in the transmissive display area.

In this configuration, the number of the first and second electrodes to be arranged in the transmissive display area is increased, and hence the distance of arrangement of the respective electrodes is decreased and, consequently, the strength of the electric field generated between the respective electrodes is increased, whereby a high optically anisotropic property may be obtained in the transmissive display area.

Preferably, the first electrode includes a plurality of first branch-shaped electrodes in the transmissive display area and the reflective display area, and the second electrode includes the plurality of second branch-shaped electrodes in the transmissive display area and the reflective display area.

In this configuration, the strength of the electric field generated in the transmissive display area may reliably be increased in comparison with the reflective display area by changing the width and number of the electrodes respectively in the first and second branch-shaped electrodes.

Preferably, the electrode width of the first branch-shaped electrode provided in the transmissive display area is smaller than the electrode width of the first branch-shaped electrode provided in the reflective display area.

In the lateral electric field system, since the electric field is not generated right above the electrode, the portions right above the electrodes do not contribute to display. Therefore, in this configuration, lowering of the numerical aperture in the transmissive display area is restrained by reducing the electrode widths of the first electrode and the second electrode arranged in the transmissive display area.

Preferably, first circularly polarizing plate is provided on the surface of the first substrate opposite from the liquid crystal layer, and second circularly polarizing plate is provided on the surface of the second substrate opposite from the liquid crystal layer.

In this configuration, circularly polarized light may be introduced into the liquid crystal layer, so that high-intensity and high-contrast display is achieved.

Electronic equipment according to an aspect of the invention is provided with the liquid crystal device described above.

With the electronic equipment, the coefficients of transmission may be equalized in the transmissive display area and the reflective display area, and the liquid crystal device achieving high-intensity and high-contrast display is provided, so that the electronic equipment itself may provide high display quality and high reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
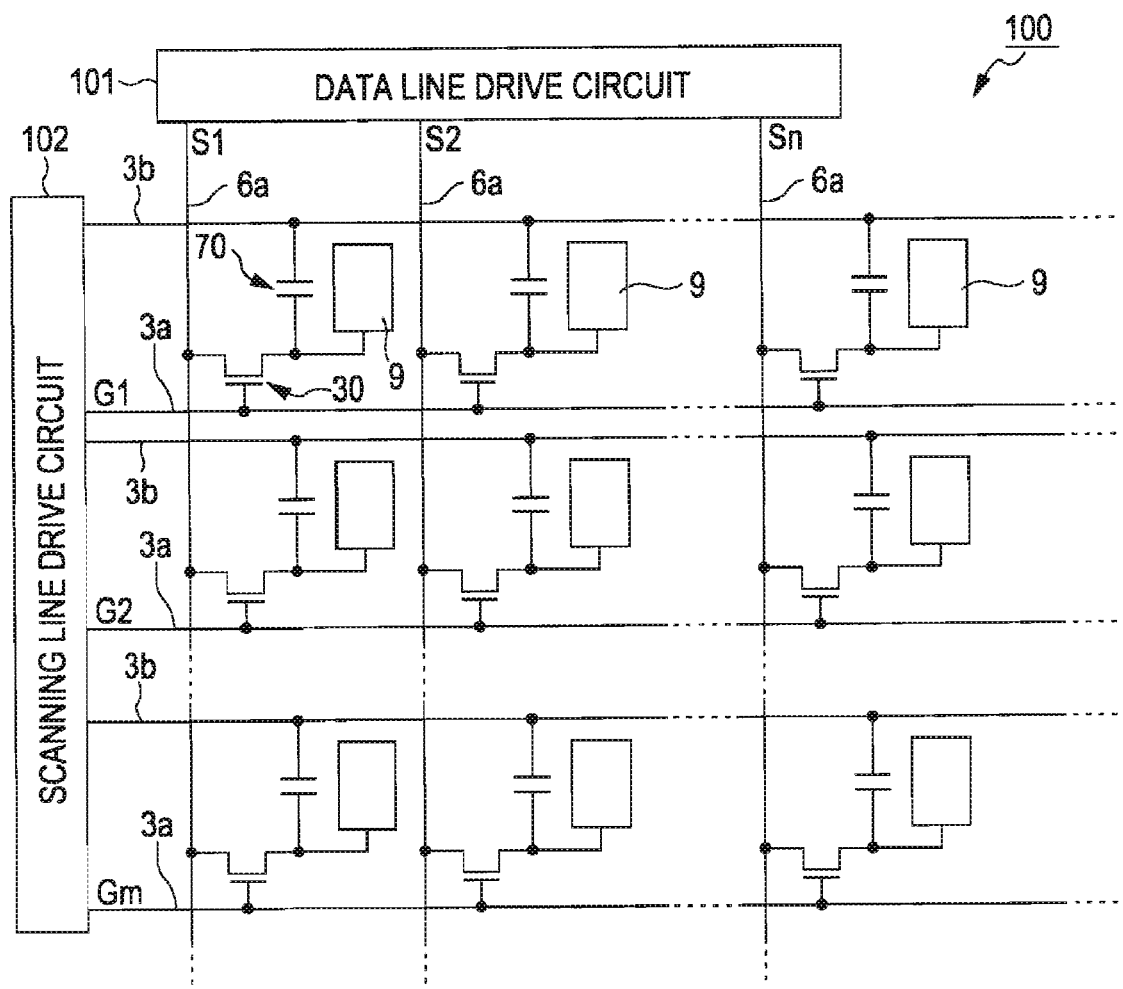
FIG. 1 is an equivalent circuit drawing of a sub-pixel area of a liquid crystal device.

Referring now to the drawings, the invention will be described. A liquid crystal device in the first embodiment is a transflective liquid crystal device in which a system called IPS (In-Plane Switching) system is employed from among lateral electric field systems in which images are displayed by causing an electric field (lateral electric field) in the direction of a substrate plane to act on the liquid crystal and controlling the alignment.

In the drawings to be referred in the respective embodiments, layers and members are shown in different scales respectively for achieving easy recognition thereof in the drawings.

A liquid crystal device in the first embodiment is a color liquid crystal device provided with a color filter on a substrate, in which one pixel is configured with three dots which output three colors of light; R (red), G (green), and B (blue) respectively. Therefore, a display area which constitutes a minimum unit for achieving display is referred to as "sub-pixel area". A display area configured of a set (R, G, B) of dots (sub-pixels) is referred to as a "pixel area".

As shown in FIG. 1, a plurality of the sub-pixel areas which are arranged in a matrix pattern and constitute an image display area of a liquid crystal device 100 each include a pixel electrode 9 and a TFT 30 for switch-controlling the pixel electrode 9 formed therein, and data lines 6a extending from a data line drive circuit 101 each are electrically connected to a source of the TFT 30. The data line drive circuit 101 supplies image signals S1, S2, . . . , Sn to the respective pixels via the data lines 6a. The image signals S1 to Sn may be supplied in this order from line to line, or may be supplied on the group basis to a plurality of the data lines 6a adjacent to each other.

Scanning lines 3a extending form a scanning line drive circuit 102 are electrically connected to gates of the TFT 30, and scanning signals G1, G2, . . . , Gm supplied in pulses from the scanning line drive circuit 102 to the scanning lines 3a at a predetermined timing are applied to the gates of the TFT 30 in this order from line to line. The pixel electrodes 9 each are electrically connected to a drain of the TFT 30. When the TFTs 30 as switching elements are brought into ON state for a certain period by the supply of scanning signals G1, G2, . . . , Gm, the image signals S1, S2, . . . , Sn supplied from the data lines 6a are written in the pixel electrodes 9 at a predetermined timing.

The image signals S1, S2, . . . , Sn of a predetermined level written in the liquid crystal via the pixel electrodes 9 are held for a certain period between the pixel electrodes 9 and common electrodes opposing thereto via the liquid crystal. Here, in order to prevent the held image signals from leaking, storage capacitors 70 are provided in parallel to liquid crystal capacitors formed between the pixel electrodes 9 and the common electrodes, and capacitor lines 3$b$ to be connected to the storage capacitors 70 are provided.

Figure 2:
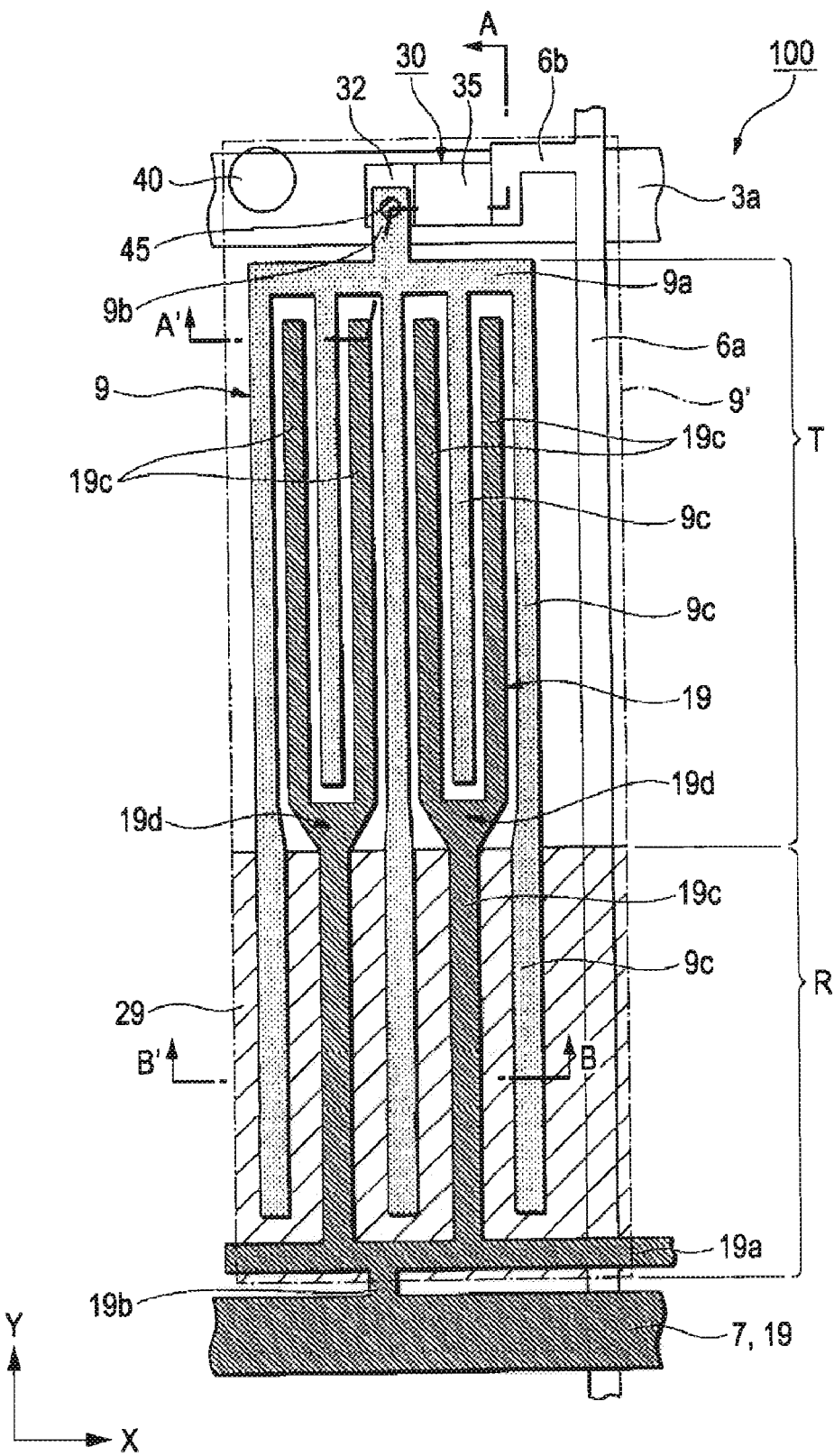
FIG. 2 is a plan view showing a configuration in the sub-pixel area.
Figure 3:
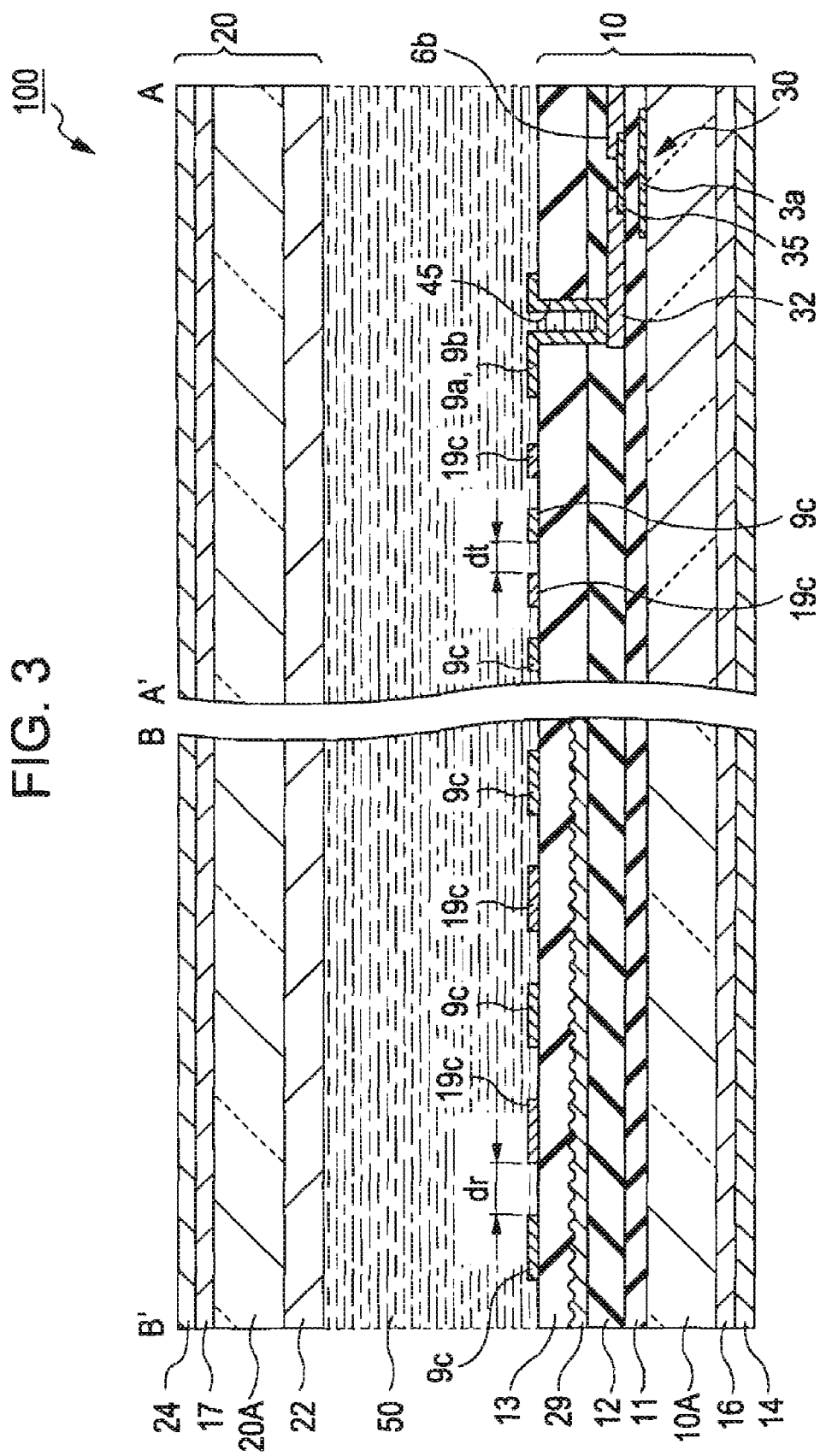
FIG. 3 is a cross sectional view of the liquid crystal device taken along the line A-A' and the line B-B' in FIG. 2.

Referring now to FIG. 2 and FIG. 3, detailed configuration of the liquid crystal device 100 will be described.

The liquid crystal device 100 includes a liquid crystal layer 50 sandwiched between a TFT array substrate (first substrate) 10 and an opposed substrate (second substrate) 20 as shown in FIG. 3. The liquid crystal layer 50 is sealed between the substrates 10 and 20 by a sealing member, not shown, provided along the edge of an area where the TFT array substrate 10 opposes the opposed substrate 20. A backlight, not shown, having a light-guide panel and a reflection panel is provided on the back side (lower side in the drawing) of the opposed substrate 20.

The liquid crystal device 100 according to the first embodiment is a transflective liquid crystal device including the pixel electrodes 9 and the common electrodes 19 on the TFT array substrate 10 on the side of the liquid crystal layer 50 as described in detail later, so that the liquid crystal layer 50 is driven by an electric field generated between the pixel electrodes 9 and the common electrodes 19, and one sub-pixel area 9' includes a reflective display area R for performing reflective display and a transmissive display area T for performing transmissive display provided therein (see FIG. 3).

The liquid crystal device 100 according to the first embodiment employs a blue-phase liquid crystal as the liquid crystal layer 50. The blue phase is an optically isotropic liquid crystal phase developing in a narrow temperature range between a chiral nematic phase and an isotropic phase. Attention has not been paid to the blue phase for a long time due to the narrowness of the temperature range (on the order of 1K). In contrast, in recent years, it was found that the blue phase is dramatically stabilized by introducing a small amount of high polymer into the blue phase. The term "stabilized" by the high polymer means to enlarge the temperature range (approx. 100K) in which the blue phase develops without impairing active kineticism of molecules that the liquid crystal originally has.

Formation of the blue phase is done by adding an adequate amount of chiral dopant which causes the general nematic liquid to twist. Then, monomer (for example 2-thylhexyl acrylate; EHA) and photo polymerization initiator (for example, 2,2-dimethoxy-2-phenyl acetophenone: DMPAP) is added to the low-molecular liquid crystal material. Then, the temperature is carefully controlled to maintain the blue phase and the photo polymerization is performed. Accordingly, the temperature range in which the blue phase is developed is enlarged to 100K or larger, so that the high polymer stabilized blue phase is achieved.

The blue phase is found to develop Kerr effect. The Kerr effect indicates a phenomenon in which when the electric field is applied to the isotropic polar substance, the birefringence (optically anisotropic property) which is proportional to the square of the electric field strength with the direction of the electric field as an optical axis is excited. That is, when the electric field is applied to the blue phase, the molecules are realigned according to the strength of the electric field with little change in lattice structure, and the birefringence (optically anisotropic property) which is proportion to the square of the strength of the electric field.

That is, in the blue phase, the birefringence ($\Delta n$) is proportional to the square of the electric field as shown in Expression 1. In Expression 1, K represents a Kerr coefficient, $\lambda$ represents the wavelength of light, and E represents the electric field generated between electrodes.

$$\Delta n = K \lambda E^2 \qquad \text{Expression 1}$$

The Kerr coefficient of the high polymer stabilized blue phase is reported to be $3.7 \times 10^{-10}$ mV$^{-2}$, and has a size about 170 times that of nitrobenzene.

The response time for building up and breaking down of the Kerr effect in the high polymer stabilized blue phase is found to be approximately 10 to 100 µs for both of them. In comparison with the fact that the response time of the general nematic liquid crystal is approximately 10 ms, it is understood that the response of the high polymer stabilized blue phase is extremely quick. The blue phase assumes optically isotropic when no voltage is applied, and hence no alignment layer is necessary as described later. The blue phase does not substantially scatter light in a wavelength range higher than visible light.

As shown in FIG. 2, the data line 6$a$ extending in the Y-axis direction and the scanning line 3$a$ extending in the X-axis direction are arranged in substantially a lattice pattern in plan view in the sub-pixel area 9' of the liquid crystal device 100 and the pixel electrode (first electrodes 9 being formed into substantially a comb shape in plan view and extending in the Y-axis direction and the common electrode (second electrode) 19 being formed into substantially a comb shape in plan view and extending in the Y-axis direction so as to engage the pixel electrode 9 are formed, in a substantially rectangular area in plan view surrounded by the data line 6$a$ and the scanning line 3$a$. Extended upright at the upper left corner in the drawing of the sub-pixel area is a column-shaped spacer 40 for holding the TFT array substrate 10 and the opposed substrate 20 apart from each other at a predetermined distance so that the thickness of the liquid crystal layer (cell gap) is maintained to be uniform. In the description shown below, the X-axis direction corresponds to the direction of extension of the scanning line 3$a$, and the Y-axis direction corresponds to the direction of extension of the data line 6$a$.

In the sub-pixel area 9', there is provided a color filter having substantially the same plane shape as the sub-pixel area. In the sub-pixel area, there is provided a reflecting layer 29 which occupies a plane area on the side of the common electrode 19 (an area on the lower side in the drawing from between two areas divided in the Y-axis direction) in the areas in which the pixel electrode 9 and the common electrode 19 extend. The reflecting layer 29 is a light-reflecting metal film such as aluminum or silver formed by pattern formation. The plane area of the sub-pixel area 9' corresponding to the reflecting layer 29 is the reflective display area R, and the remaining area is the transmissive display area T. The reflecting layer 29 used here preferably has a light-scattering property by being formed with concavities and convexities on the surface thereof. In this configuration, visibility in the reflective display may be improved. In the sub-pixel area, the plane area on the side of the pixel electrode 9 in the areas in which the pixel electrode 9 and the common electrode 19 extend may be used as the reflective display area.

As shown in FIG. 2, the pixel electrode 9 includes a proximal portion 9$a$ extending along the scanning line 3$a$, a plurality of (five in the first embodiment) band-shaped electrodes (first branch-shaped electrode) 9$c$ being connected to the proximal portion 9$a$ and extending in the direction of the data line 6$a$, and a contact portion 9$b$ extending from the proximal portion 9$a$ In the +Y side. The pixel electrode 9 is an electrode member formed of transparent conductive material such as ITO (indium tin oxide) by pattern formation.

The band-shaped electrodes 9$c$ are of two types of lengths. The band-shaped electrodes 9$c$ having one length have a uniform electrode width and are arranged only in the transmissive display area T, and the band-shaped electrodes 9c having the other length are formed so as to extend from the transmissive display area T into the reflective display area R. The band-shaped electrodes 9c having the other length are formed so as to change the electrode width gradually in the vicinity of the boundary between the reflective display area R and the transmissive display area T, and the electrode width in the reflective display area R is larger than that in the transmissive display area T. Since the electric field is not generated right above the electrodes in the lateral electric field (IPS) system, the liquid crystal layer arranged right above the electrodes does not demonstrate the birefringence, and hence does not contribute to display. Therefore, by reducing the electrode width of the band-shaped electrodes 9c arranged in the transmissive display area T with the configuration described above, lowering of the numerical aperture in particular in the transmissive display area T is restrained. Here, portions of the band-shaped electrodes 9c where the electrode widths start to increase may be in either one or the reflective display area R and the transmissive display area T. That is, they may be started to chance within the transmissive display area T, or may be started to change within the transmissive display area T. Alternatively, a configuration in which the electrode widths of the band-shaped electrodes 9c change from the boundary between the reflective display area R and the transmissive display area T may be employed.

The common electrode 19 is formed integrally with a common electrode line 7 extending along the scanning line 3a, and includes a proximal portion 19b extending from the common electrode line 7 in the y-axis direction, a main line portion 19a connected to the proximal portion 19b and extends in the X-axis direction, and a plurality of band-shaped electrodes 19c extending from the main line portion 19a in the +Y side. Although the common electrode 19 is also formed of transparent conductive material such as ITO, the pixel electrode 9 and the common electrode 19 may be formed of metal material such as chrome in addition to the above-described transparent conductive material.

The band-shaped electrode 19c extends from the reflective display area R to the transmissive display area T and is branched to a plurality of strips (two in the first embodiment) in the vicinity of the boundary between the reflective display area R and the transmissive display area T. The bifurcated band-shaped electrodes 19c are formed to have the same electrode width in the transmissive display area T. Arranged between the bifurcated portions of the band-shaped electrode 9c is the band-shaped electrodes 9c having the one length (shorter ones) which constitute the pixel electrode 9 so that the band-shaped electrodes 9c engage therewith in a comb pattern. The band-shaped electrodes 19c have the branched structure as describe above, the electrode width in the reflective display area R is larger than the electrode width thereof in the transmissive display area T. Accordingly, as in the case of the band-shaped electrodes 9c, the lowering of the numerical aperture in the transmissive display area T is restrained by reducing the electrode width of the band-shaped electrodes 9c arranged in the transmissive display area T.

The TFT 30 is provided in the vicinity of the intersection between the data line 6a extending in the X-axis direction and the scanning line 3a extending in the Y-axis direction, and includes an island-shaped semiconductor layer 35 formed of amorphous silicon film formed partly within the plane area of the scanning line 3a, a source electrode 6b formed so as to be overlapped with the semiconductor layer 35 partly two-dimensionally, and a drain electrode 32. The scanning line 3a functions as a gate electrode of the TFT 30 at a position which is overlapped with the semiconductor layer 35 two-dimensionally. The source electrode 6b is a wiring of substantially an inverted L-shape in plan view branched from the data line 6a and extending to the semiconductor layer 35. The contact portion 9b of the pixel electrode 9 is arranged on the drain electrode 32 two-dimensionally so as to overlap therewith, and the drain electrode 32 and the pixel electrode 9 are electrically connected via a pixel contact hole 45 provided at the same position.

In the sub-pixel area 91 of the liquid crystal device in the first embodiment, as shown in FIG. 3, the distance dr between the band-shaped electrodes 9c and 19c arranged in the reflective display area R in the X-axis direction is larger than the distance dt between the band-shaped electrodes 9d and 19d arranged in the transmissive display area T in the X-axis direction. More specifically, the distance dr is set to be about 1.4 times the distance dt.

When the liquid crystal device is in operation, voltage is applied between the band-shaped electrodes 9c of the pixel electrode 9 and the band-shaped electrode 19c of the common electrode 19 to cause the electric field (lateral electric field) in the direction of the XY surface (the direction of the substrate plane) to act on the liquid crystal layer 50 in the sub-pixel area so as to cause the birefringence in the liquid crystal layer 50.

In the transflective liquid crystal device in the related art, a multi-gap structure in which the thickness of the liquid crystal layer in the reflective display area is differentiated from the thickness of the liquid crystal layer in the transmissive display area, so that the phase difference applied to light which passes through the liquid crystal layer 50 (retardation) is optimized respectively in the reflective display area R and the transmissive display area T has been employed. More specifically, the thicknesses of the liquid crystal layers in the respective areas are adjusted so that the phase difference in the reflective display area becomes λ/4 and the phase difference in the transmissive display area becomes λ/2, so that the thickness of the liquid crystal layer in the reflective display area becomes substantially half the thickness of the liquid crystal layer in the transmissive display area T.

In the nematic liquid crystal used in the liquid crystal device in the related art, a bulk of the liquid crystal molecules are resiliently aligned due to the electric field, while in the blue phase, only alignment in a local area where the electric field is generated can be changed.

Therefore, when the multi-gap structure is employed in the liquid crystal device of the lateral electric field (IPS) system using the blue phase, the influence of the lateral electric field does not reach the liquid crystal molecules on the side of the opposed substrate in the transmissive display area in which the thickness of the liquid crystal is large (two times the reflective display area), and hence the liquid crystal molecules on the side of the opposed substrate cannot be aligned sufficiently, whereby the coefficient of transmission is lowered. That is, when the blue phase is used, it is necessary to adjust the phase difference of the liquid crystal layer in the transmissive display area T and the phase difference in the liquid crystal layer in the reflective display area R without employing the multi-gap structure.

The liquid crystal layer 50 used in the liquid crystal device 100 in the first embodiment is adapted to demonstrate the birefringence which is proportional to the square of the applied voltage. Here, the electric field E which causes the birefringence in the liquid crystal layer 50 is expressed by $E=V/d$ where V represents a voltage applied between the band-shaped electrodes 9c and 19c and d represents the distance between these electrodes.

In the reflective display area R, since incident light is reflected from the reflecting layer 29 and outputted to the outside as described later, light passes through the liquid crystal layer 50 twice. Therefore the virtual thickness of the liquid crystal is twice the transmissive display area T. The birefringence phase differences in the respective display areas (retardations) are calculated from the product of the thickness of the liquid crystal and the birefringence of the liquid crystal layer 50 (blue phase). In order to facilitate the description, assuming that the thickness of liquid crystal in the reflective display area R is 2d and the thickness of the liquid crystal in the transmissive display area T is d, the birefringence in the transmissive display area T may be set to two times the reflective display area R for setting the retardations in the transmissive display area T and the reflective display area R to be substantially the same.

Therefore, in the liquid crystal device 110 according to the first embodiment, the inter-electrode distance dt in the transmissive display area T (the distance between the band-shaped electrodes 9c and the band-shaped electrode 19c) is set substantially to $1/\sqrt{2}$ times the inter-electrode distance dr in the reflective display area R.

Since the blue phase demonstrates the birefringence (optically anisotropic property) which is proportional to the square of the electric field, the liquid crystal device 100 according to the first embodiment demonstrates two times (that is, square times of $\sqrt{2}$) the birefringence in the reflective display area in the transmissive display area T.

That is, in the liquid crystal, device 100 in the first embodiment, the retardations in the transmissive display area T and the reflective display area R may be adjusted to the same level by demonstrating the birefringence which is two times that in the reflective display area in the transmissive display area T, whereby the coefficients of transmission may be equalized in the transmissive display area T and the reflective display area R.

Referring now to a cross-sectional structure shown in FIG. 3, a wave plate 16 and a polarizing plate 14 are laminated in sequence on the outer surface of the TFT array substrate 10 (on the opposite side from the liquid crystal layer 50), and a wave plate 17 and a polarizing late 24 are laminated and arranged in sequence on the outer surface of the opposed substrate 20. The wave plates 16 and 17 are λ/4 wave palates which provide the phase difference of substantially ¼ wavelength to the transmitting light.

The lagging axes of the wave plates 16 and 17 are arranged so as to form about 45° with respect to the polarization axes of the polarizing plates 14 and 24. In this case, the polarizing plates 14 and 24 and the wave plates 16 and 17 constitute circular polarizing plates 18 and 25. Light transmitted through the polarizing plates 14 and 24 and the wave plates 16 and 17 is converted into the circularly polarized light, and is double-refracted by the liquid crystal layer 50. The configuration of the circular polarizing plates 18 and 25 may be of a broadband circular polarizing plate including a combination of a polarizing plate, a λ/2 wave plate, and a λ/4 wave plate as well as the configuration including a combination of the polarizing plates 14 and 24, and the λ/4 wave plates 16 and 17 as in the first embodiment.

The TFT array substrate 10 includes a transmissive substrate body 10A formed of glass, quartz, plastic, etc., as a base member. The scanning line 3a is formed on the inner surface of the substrate body 10A (on the side of the liquid crystal layer 50), and a gate insulating film 11 is formed so as to cover the scanning line 3a. The semiconductor layer 35 formed of amorphous silicon is formed on the gate insulating film 11 and the source electrode 6b and the drain electrode 32 are provided so as to cover partly on the semiconductor layer 35.

The semiconductor layer 35 is arranged so as to oppose the scanning line 3a via the gate insulating film 11, and the scanning line 3a constitutes the gate electrode of the TFT 30 in the opposed area. A first inter-layer insulating film 12 is formed so as to cover the semiconductor layer 35, the source electrode 6b, and the drain electrode 32, and the reflecting layer 29 formed of a light-reflecting metal film such as aluminum or silver is formed partly on the first inter-layer insulating film 12 in the sub-pixel area. A second inter-layer insulating film 13 formed of silicon oxide or the like is formed so as to cover the reflecting layer 29 and the first inter-layer insulating film 12.

Formed on the second inter-layer insulating film 13 is the pixel electrode 9 and the common electrode 19 formed of the transparent conductive material such as ITO. Formed in the transmissive display area T is the pixel contact hole 45 which penetrates through the second inter-layer insulating film 13 and the first inter-layer insulating film 12, and the pixel electrode 9 and the drain electrode 32 of the TFT 30 are electrically connected by part of the contact portion 9b of the pixel electrode 9 being embedded within the pixel contact hole 45.

Provided on the inner surface of the opposed substrate 20 (on the side of the liquid crystal layer 50) is a color filter 22. The color filter 22 preferably divided into two types of areas being different in chromaticity in the dot area. More specifically, a configuration in which a first color material area is provided corresponding to the plane area of the transmissive display area T, a second color material area is provided corresponding to the plane area of the reflective display area R, so that the chromaticity of the first color material area is larger than the chromaticity of the second color material area may be employed. In this configuration, difference in chromaticity of display light between the transmissive display area T in which display light passes through the color filter 22 only once and the reflective display area R in which it passes therethrough twice may be prevented, so that the appearance is uniformized between the reflective display and the transmissive display and hence the display quality may be improved.

Preferably, a flattening film formed of transparent resin material or the like is further laminated on the color filter 22. Accordingly, the surface of the opposed substrate 20 is flattened and hence the thickness of the liquid crystal layer 50 may be uniformized, so that lowering of the contrast due to unevenness of the drive voltage in the dot area may be prevented.

Display Operation

Subsequently, the display operation of the liquid crystal device 100 according to the first embodiment will be described.

Firstly, the transmissive display (transmissive mode) will be described. In the transmissive mode, light irradiated from a backlight (not shown) provided outside the TFT array substrate passes through the polarizing plate 14 and the wave plate 16 and enters the liquid crystal layer 50 in a state of being converted into the circularly polarized light.

As described above, since the blue phase demonstrates optically isotropic property when no voltage is applied, the light incoming into the liquid crystal layer 50 is maintained in the circularly polarized light without affected by the birefringence. In addition, the light passed through the wave plate 17 is converted into the linearly polarized light which is orthogonal to the transmission axis of the polarizing plate 24. Since the linearly polarized light does not pass through the polarizing plate 24, the liquid crystal device 100 in the first embodiment assumes black display when no voltage is applied (normally black display).

In contrast, when voltage is applied between the electrodes 9 and 19, the liquid crystal layer 50 demonstrates the birefringence, so that the circularly polarized light incoming from the backlight to the liquid crystal layer 50 is converted into an elliptically polarized light in the process of passing through the liquid crystal layer 50. Even though the incident light passes through the polarizing plate 24, it is not converted into the linearly polarized light which is orthogonal to the transmission axis of the polarizing plate 24, and passes through the polarizing plate 24 partly or entirely. Therefore, white display is assumed when voltage is applied.

Subsequently, the reflective display (reflective mode) will be described. The outside light entering from outside the opposed substrate 20 is converted into a circularly polarized light by being passed through the polarizing plate 24 and the wave plate 17, and enters the liquid crystal layer 50. Since the blue phase assumes an optically isotropic property when no voltage is applied, the liquid crystal layer 50 does not demonstrate the birefringence. Therefore, the incident light proceeds in the liquid crystal layer 50 while holding the circularly polarized light, and reaches the reflecting layer 29. Then, the circularly polarized light which is reflected by the reflecting layer 29 goes back to the liquid crystal layer 50, and enters the wave plate 17 again. At this time, the circularly polarized light reflected by the reflecting layer 29 is inverted in direction of rotation at the time of reflection, and hence is converted into the linearly polarized light which extends orthogonally to the transmission axis of the polarizing plate 24 when passing through the wave plate 17. Since the linearly polarized light cannot pass through the polarizing plate 24, the liquid crystal device 100 assumes black display when no voltage is applied in the reflective mode (normally black display).

On the other hand, when voltage is applied between the electrodes 9 and 19, the liquid crystal layer 50 demonstrates the birefringence, and the incident light, is applied with a predetermined phase difference ($\lambda/4$) when passing through the liquid crystal layer 50, and reaches the reflecting layer 29. Then, after having reflected by the reflecting layer 29, the light is applied again with the predetermined phase difference ($\lambda/4$) when passing through the liquid crystal layer 50 and enters the wave plate 17. At this time, the reflected light is converted into the linearly polarized light parallel to the transmission axis of the polarizing plate 24 while passing through the wave plate 17. Therefore, the reflected light is passed through the polarizing plate 24 and is visualized, so that the sub-pixel area assumes bright display.

Therefore, the liquid crystal device 100 in the first embodiment assumes black display both in the reflective display area R and the transmissive display area T when no voltage is applied, and assumes white display when voltage is applied.

With the liquid crystal device 100 in the first embodiment, the retardations in the reflective display in which light passed through the liquid crystal layer 50 twice is used as display light and in the transmissive display in which light passed through the liquid crystal layer 50 only once is used as display light are substantially equalized by setting the distance dt between the band-shaped electrodes 9c and 19c in the transmissive display area T to 1.4 times the distance dr in the reflective display area R, so that the electro-optic characteristics of the reflective display area R and the electro-optic characteristics of the transmissive display area T are equalized to achieve preferable display both in the reflective display and the transmissive display. Therefore, high-intensity and high-contrast display is achieved over the entire sub-pixel area 9'.

Figure 4:
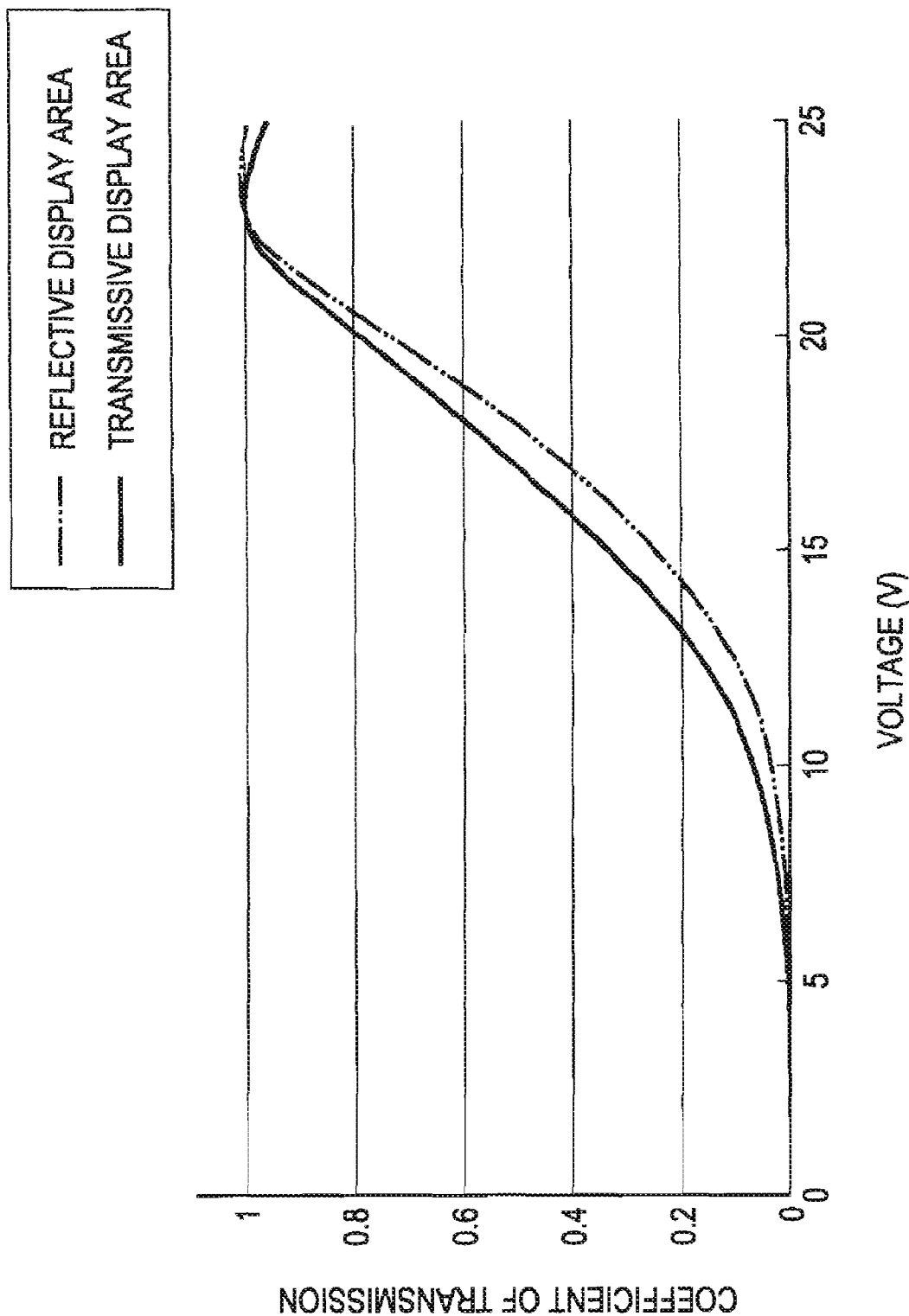
FIG. 4 is a drawing showing V-T characteristic in a reflective display area and a transmissive display area.

FIG. 4 shows a result of measurement done by the inventor, showing V-T characteristics in the reflective display area R and the transmissive display area T with liquid crystal device 100 in the first embodiment. In FIG. 4, the lateral axis represents voltage (V) to be applied between the band-shaped electrodes 9 and 19c, and in FIG. 4, the vertical axis represents coefficients of transmission both in the reflective display area R and the transmissive display area T.

The liquid crystal device 100 in the first embodiment is adapted in such a manner that an electric field strength which is two times that in the reflective display area R is obtained in the transmissive display area T by setting the inter-electrode distance dt between the band-shaped electrodes 9c and 19c in the transmissive display area T to $1/\sqrt{2}$ times the inter-electrode distance dr in the reflective display area R.

As known in FIG. 4, with the liquid crystal device 100, substantially the same coefficient of transmission may be obtained in the reflective display area R and the transmissive display area T without employing the multi-gap structure. Therefore, high-intensity and high-contrast display are achieved over the entire sub-pixel area.

Second Embodiment

Figure 5:
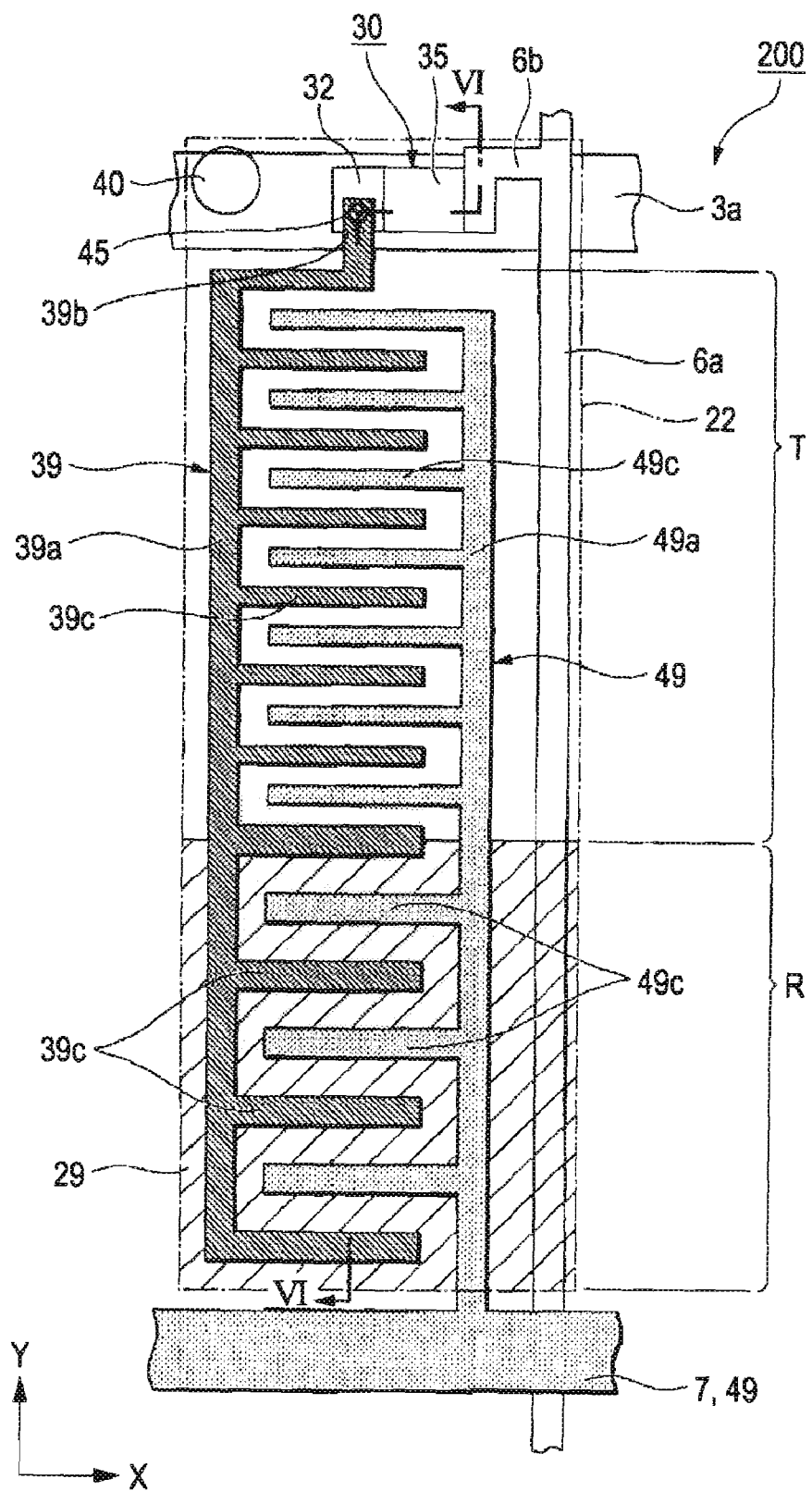
FIG. 5 is a plan view showing a configuration of the sub-pixel area according to a second embodiment.
Figure 6:
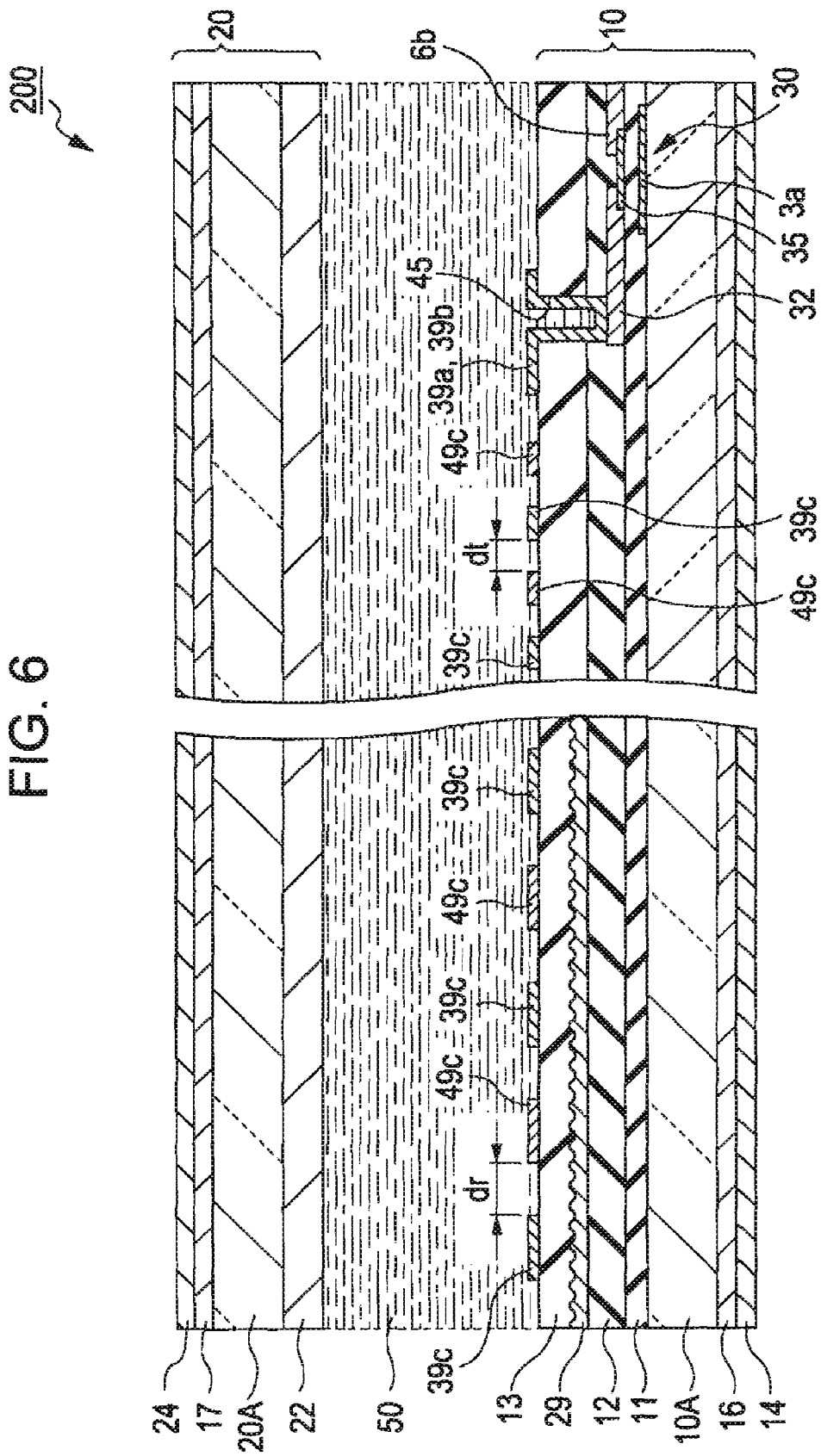
FIG. 6 is a cross-sectional view of the liquid crystal device taken along the line A-A' in FIG. 5.

Referring now to FIG. 5 and FIG. 6, a second embodiment of the liquid crystal device according to an aspect of the invention.

FIG. 5 is a plan view showing a configuration of a given sub-pixel area according to a liquid crystal device 200 in the second embodiment, and FIG. 6 is a view partly in cross section taken along the line A-A' and B-B' in FIG. 5.

The basic configuration of the liquid crystal device 200 in the second embodiment is similar to the first embodiment shown above, and is different from the first embodiment in the shapes of the pixel electrode and the common electrode. FIG. 5 is a drawing corresponding to FIG. 2 in the first embodiment, and FIG. 6 is a drawing corresponding to FIG. 3 in the first embodiment. Therefore, in the respective drawings which are referenced in the second embodiment, the same parts as the liquid crystal device 100 in the first embodiment shown from FIG. 1 to FIG. 3 are represented by the same reference numerals, and description of such parts will be omitted.

The liquid crystal device 200 in the second embodiment includes a pixel electrode (first electrode) 39 extending in the Y-axis direction substantially in the comb shape in plan view and a common electrode (second electrode) 49 extending in the Y-axis direction substantially in the comb shape in plan view which engages the pixel electrode 39 in a substantially rectangular area in plan view surrounded by the data line 6a and the scanning line 3a.

The pixel electrode 39 includes a proximal, portion 39a extending along the data line 6a, a plurality of band-shaped electrodes (first branch-shaped electrodes) 39c extending in the direction of the scanning line 3a, and a contact portion 39b of substantially L-shape extending from the proximal portion 39a. The pixel electrode 39 is an electrode member formed of the transparent conductive material such as ITO (indium tin oxide) by pattern formation.

The common electrode 49 includes a proximal portion 49a extending along the data line 6a, and a plurality of band-shaped electrodes (second branch-shaped electrodes) 49c being connected to the proximal portion 49a and extending in the direction of the scanning line 3a. The proximal portion

49a is integrally formed with the common electrode line 7 formed along the scanning line 3a.

As shown in FIG. 5, the electrode widths of the band-shaped electrodes 39c and 49c in the reflective display area R are set to be larger than the electrode widths of the band-shaped electrodes 39c and 49c in the transmissive display area T. In general, in the lateral electric field system, the portions right above the electrodes which do not generate electric field do not contribute to display However, through the employment of the above-described configuration, lowering of the numerical aperture in the transmissive display area T may be restrained.

The distance dr in the Y-axis direction between the band-shaped electrodes 39c and 49c arranged in the reflective display area R is larger than the distance dt in the X-axis direction between the band-shaped electrodes 9d and 19d arranged in the transmissive display area T, and more specifically, the transmissive display area T is set to be 1.4 times the reflective display area R as in the first embodiment (see FIG. 6).

Referring now to the cross-sectional structure shown in FIG. 6, the liquid crystal layer 50 of the blue phase is sandwiched between the TFT array substrate 10 and the opposed substrate 20 arranged so as to oppose to each other, and the wave plate 16 and the polarizing plate 14 are laminated in sequence on the outer surface (the opposite side from the liquid crystal layer 50) of the TFT array substrate 10, and the wave plate 17 and the polarizing plate 24 are laminated and arranged in sequence on the outer surface of the opposed substrate 20.

In the liquid crystal device 200 according to the second embodiment as well, the retardations in the reflective display area R in which light passed through the liquid crystal layer 50 twice is used as display light and in the transmissive display area T in which light passed through the liquid crystal layer 50 only once is used as display light are substantially equalized. Therefore, substantially the same coefficient of transmission may be obtained in the reflective display area R and the transmissive display area T, and hence high-intensity and high-contrast display are achieved over the entire sub-pixel area.

Electronic Equipment

Figure 7:
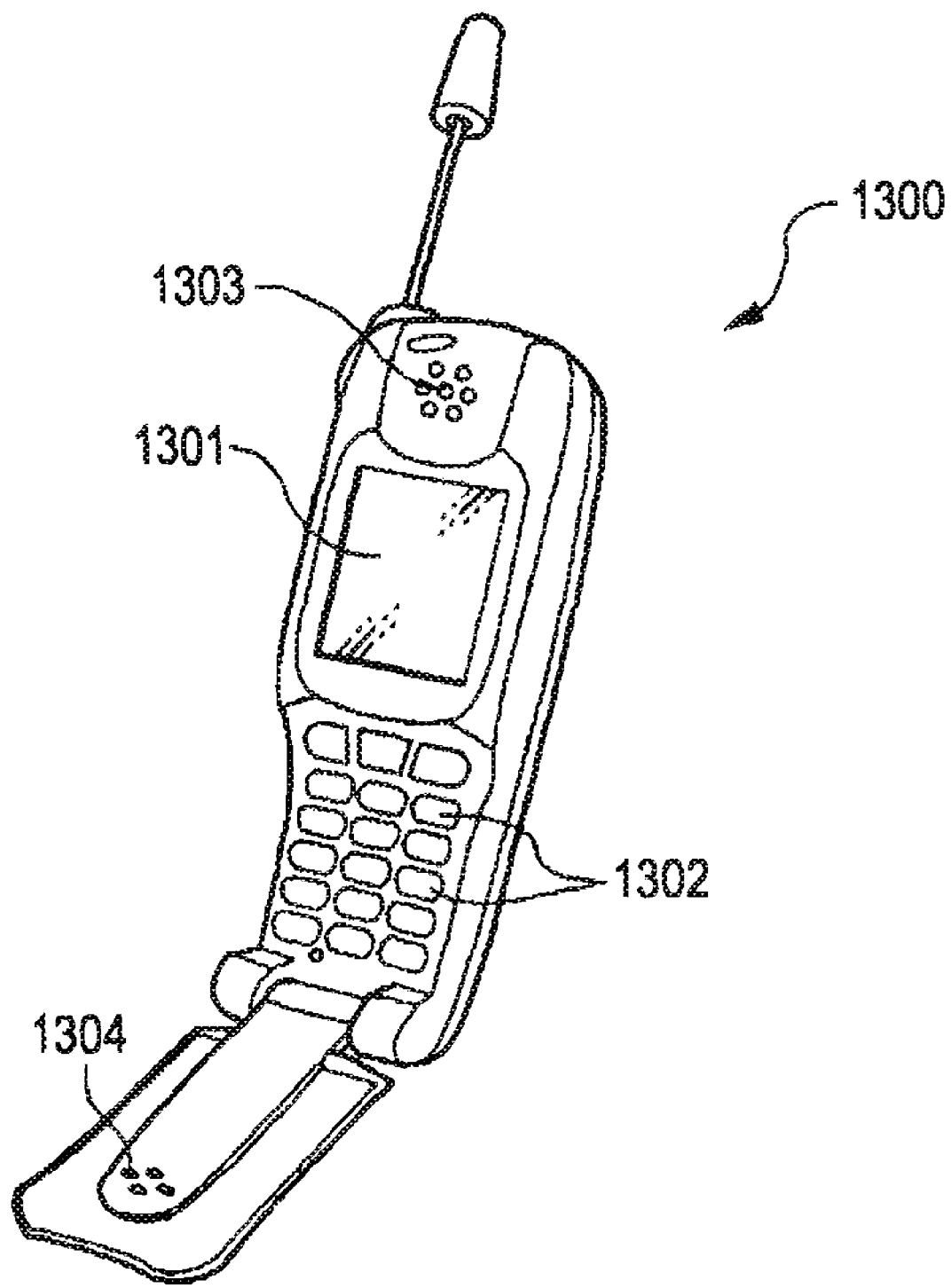
FIG. 7 is a perspective drawing showing a configuration of an example of electronic equipment.

FIG. 7 is a perspective drawing showing a mobile phone as an example of electronic equipment having the liquid crystal device according to an aspect of the invention in a display unit. A mobile phone 1300 includes the liquid crystal device according to an aspect of the invention as a compact display unit 1301, and also includes a plurality of operating buttons 1302, an ear piece 1303, and a mouthy piece 1304.

The application of the liquid crystal device according to the embodiments shown above is not limited to the mobile phone shown above, and may be preferably used as image display means for electronic books, personal computers, digital still cameras, liquid crystal TVs, view finder type or monitor direct view video tape recorders, car navigation systems, pagers, electronic data books, calculators, word processors, work stations, TV phones, POS terminals, equipment including a touch panel. In any of the electronic equipment shown above, transmissive display and reflective display in high-intensity, high-contrast, and wide angle of visibility are enabled, so that reliable equipment is provided.

What is claimed is:

1. A liquid crystal device including a liquid crystal layer having liquid crystal which is optically isotropic when no electric field is applied and shows optical anisotropy which is proportional to the square of an electric field which is applied to the liquid crystal, and a pair of substrates which sandwich the liquid crystal layer, comprising:

sub-pixels each including a reflective display area for reflective display and a transmissive display area for transmissive display; and first and second electrodes, provided in both of the reflective display area and the transmissive display area, wherein the liquid crystal layer is driven by an electric field generated between the first electrode and the second electrode, wherein the distance between the first electrode and the second electrode in the transmissive display area is smaller than the distance between the first electrode and the second electrode in the reflective display area, and wherein the electrode width of at least one of the first electrode and the second electrode provided in the transmissive display area is smaller than the electrode width of at least one of the first electrode and the second electrode provided in the reflective display area, wherein the first electrode includes a plurality of first branch-shaped electrodes in the transmissive display area and the reflective display area, and the second electrode includes a plurality of second branch-shaped electrodes in the transmissive display area and the reflective display area, and the plurality of first branch-shaped electrodes are arranged alternately within the plurality of second branch shaped electrodes in both the transmissive display area and the reflective display area, and wherein each of the first branch-shaped electrodes in the reflective display area split into two branch portions in the transmissive display area near a boundary between the reflective display area and the transmissive display area.

2. The liquid crystal device according to claim 1, wherein the distance between the first electrode and the second electrode in the reflective display area is set to approximately 1.4 times the distance between the first electrode and the second electrode in the transmissive display area.

3. The liquid crystal device according to claim 1, wherein a first circularly polarizing plate is provided on a surface of the first substrate opposite from the liquid crystal layer, and a second circularly polarizing plate is provided on the a surface of the second substrate opposite from the liquid crystal layer.

4. Electronic equipment comprising the liquid crystal device according to claim 1.

5. A liquid crystal device including a liquid crystal layer having liquid crystal which is optically isotropic when no electric field is applied and shows optical anisotropy which is proportional to the square of an electric field which is applied to the liquid crystal, and a pair of substrates which sandwich the liquid crystal layer, comprising:

sub-pixels each including a reflective display area for reflective display and a transmissive display area for transmissive display; and first and second electrodes provided in both of the reflective display area and the transmissive display area, wherein the liquid crystal layer is driven by an electric field generated between the first electrode and the second electrode, wherein the first electrode includes a plurality of first branch-shaped electrodes in the transmissive display area and a plurality of second branch-shaped electrodes in both the reflective display area and the transmissive display area, wherein the second electrode includes a plurality of third branch-shaped electrodes provided in the transmissive display area and a plurality of fourth branch-shaped electrodes provided in the reflective display area, the third branch-shaped electrodes are branched from a piece on one side of the fourth branch-shaped electrode, and wherein the distance between the first branch-shaped electrode and the third branch-shaped electrode in the transmissive display area is smaller than the distance between the second branch-shaped electrode and the fourth branch-shaped electrode in the reflective display area, and wherein the plurality of first branch-shaped electrodes are alternately arranged within the plurality of third branch-shaped electrodes in the transmissive display area, and the plurality of second branch-shaped electrodes are alternately arranged within the plurality of fourth branch-shaped electrodes in the reflective display area.

6. The liquid crystal device according to claim 5, wherein at least one of the first electrode and the second electrode has an electrode width in the transmissive display area smaller than an electrode width in the reflective display area.

7. The liquid crystal device according to claim 5, wherein the first branch-shaped electrode has an electrode width in the transmissive display area smaller than an electrode width of the second branch-shaped electrode width in the reflective display area, and the third branch-shaped electrode has an electrode width in the transmissive display area smaller than an electrode width of the fourth branch-shaped electrode in the reflective display area.

8. The liquid crystal device according to claim 5, wherein a first circularly polarizing plate is provided on a surface of the first substrate opposite from the liquid crystal layer, and a second circularly polarizing plate is provided on a surface of the second substrate opposite from the liquid crystal layer.

9. Electronic equipment comprising the liquid crystal device according to claim 5.

* * * * *